(12) United States Patent
Koyanagi

(10) Patent No.: US 11,618,310 B2
(45) Date of Patent: Apr. 4, 2023

(54) HYBRID ELECTRIC VEHICLE

(71) Applicant: TOYOTA JIDOSHA KABUSHIKI KAISHA, Aichi-ken (JP)

(72) Inventor: Hirotaka Koyanagi, Yokohama (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 62 days.

(21) Appl. No.: 17/399,057

(22) Filed: Aug. 11, 2021

(65) Prior Publication Data

US 2022/0111826 A1 Apr. 14, 2022

(30) Foreign Application Priority Data

Oct. 12, 2020 (JP) .............................. JP2020-171617

(51) Int. Cl.
*B60K 6/50* (2007.10)
*B60K 6/48* (2007.10)
*H01M 10/625* (2014.01)
*H01M 10/6566* (2014.01)
*B60K 13/04* (2006.01)

(52) U.S. Cl.
CPC ................ *B60K 6/48* (2013.01); *B60K 13/04* (2013.01); *H01M 10/625* (2015.04); *H01M 10/6566* (2015.04); *B60Y 2200/92* (2013.01); *H01M 2220/20* (2013.01)

(58) Field of Classification Search
CPC ...... B60K 1/00; B60K 2001/003; B60K 1/04; B60K 2001/005; B60K 2001/006; B60K 2001/0438; B60K 2006/4825; B60K 6/405; B60K 13/04; B60L 2210/40; B60L 2240/425; H02P 1/00; F02N 11/04; F02N 2011/0896; B60R 13/0876; B60R 11/00; H01M 10/6566; H01M 10/625; H01M 2220/20; B60Y 2200/92

See application file for complete search history.

(56) References Cited

U.S. PATENT DOCUMENTS

| 2014/0111003 A1* | 4/2014 | Imai ...................... B60L 15/007 307/10.1 |
| 2019/0016208 A1* | 1/2019 | Tomokage ............. H02K 11/33 |
| 2019/0118794 A1* | 4/2019 | Slottskog .............. B60W 10/06 |

FOREIGN PATENT DOCUMENTS

| CN | 112498079 A * | 3/2021 | ............... B60K 1/04 |
| DE | 102016215190 A1 | 2/2018 | |

(Continued)

*Primary Examiner* — George C Jin
*Assistant Examiner* — Teuta B Holbrook
(74) *Attorney, Agent, or Firm* — Hauptman Ham, LLP

(57) ABSTRACT

A hybrid electric vehicle includes: an internal combustion engine; a rotary electric machine; an electric storage device; and a power control unit that converts electric power between the rotary electric machine and the electric storage device, and controls the rotary electric machine, the hybrid electric vehicle being capable of traveling by rotating a driving wheel by using power of at least one of the internal combustion engine and the rotary electric machine. Further, the power control unit is provided below the rotary electric machine, and a heat generation source that has higher temperature than the power control unit, a heat transfer inhibition unit that inhibits heat transfer from the heat generation source to the power control unit, and the power control unit are disposed in this order from one side to another side in a vehicle width direction.

6 Claims, 2 Drawing Sheets

(56) References Cited

FOREIGN PATENT DOCUMENTS

JP          2004284447 A  *  10/2004
JP          2019081509 A  *   5/2019   ......... B60H 1/00328

* cited by examiner

FRONT SIDE ← VEHICLE FRONT-REAR DIRECTION → REAR SIDE

HYBRID ELECTRIC VEHICLE

CROSS-REFERENCE TO RELATED APPLICATION(S)

The present application claims priority to and incorporates by reference the entire contents of Japanese Patent Application No. 2020-171617 filed in Japan on Oct. 12, 2020.

BACKGROUND

The present disclosure relates to a hybrid electric vehicle.

A hybrid electric vehicle including an engine and a motor as power sources and capable of traveling by using power of at least one of the engine and the motor is known in the related art. In the hybrid electric vehicle, for example, a crankshaft of the engine and a rotary shaft of the motor are connected via a connecting/disconnecting clutch. The connecting/disconnecting clutch connects and disconnects a power transmission path between the engine and the motor. Power from at least one of the engine and the motor is transmitted from the rotary shaft of the motor to driving wheels via a transmission or the like. Furthermore, German Patent Application Publication No. 102016215190 discloses a configuration in which a power control unit is provided on a side portion of the transmission in the vehicle width direction. The power control unit converts electric power between the motor and the battery, and controls the motor.

SUMMARY

There is a need for providing a hybrid electric vehicle capable of inhibiting adverse effects of heat of a high-temperature component on a power control unit.

According to an embodiment, an hybrid electric vehicle includes: an internal combustion engine; a rotary electric machine; an electric storage device; and a power control unit that converts electric power between the rotary electric machine and the electric storage device, and controls the rotary electric machine, the hybrid electric vehicle being capable of traveling by rotating a driving wheel by using power of at least one of the internal combustion engine and the rotary electric machine. Further, the power control unit is provided below the rotary electric machine, and a heat generation source that has higher temperature than the power control unit, a heat transfer inhibition unit that inhibits heat transfer from the heat generation source to the power control unit, and the power control unit are disposed in this order from one side to another side in a vehicle width direction.

DETAILED DESCRIPTION

In the related art, in the configuration disclosed in German Patent Application Publication No. 102016215190, the positional relationship between a power control unit and peripheral components of the power control unit is not considered at all. Thus, for example, when a high-temperature component having a higher temperature than the power control unit, such as an exhaust pipe for discharging exhaust gas from the engine, is disposed near the power control unit, heat of the high-temperature component may have adverse effects (thermal damages) on the power control unit.

Hereinafter, an embodiment of a hybrid electric vehicle according to the present disclosure will be described. Note that the present disclosure is not limited by the present embodiment.

Figure 1:
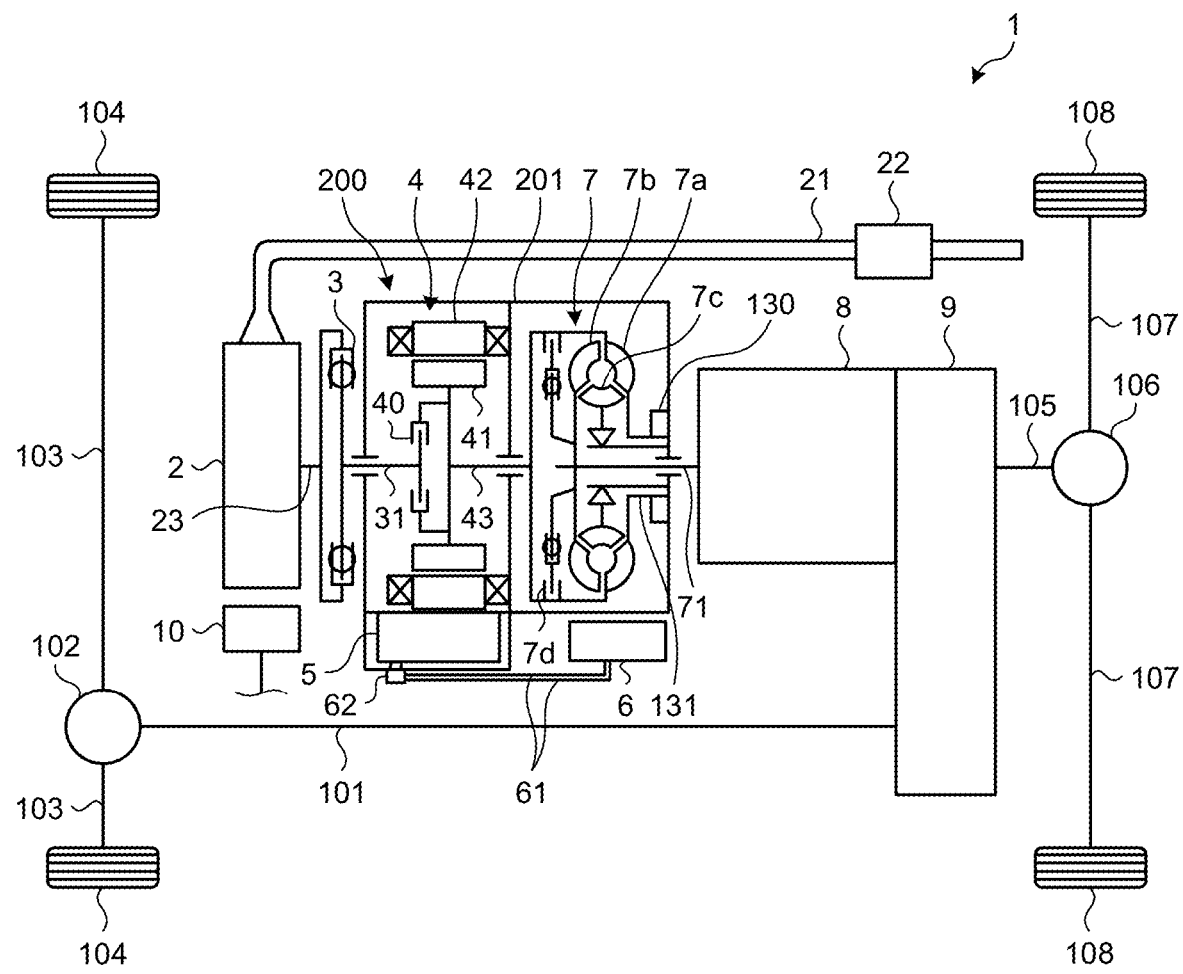
FIG. 1 illustrates a schematic configuration of a hybrid electric vehicle according to an embodiment.
Figure 2:
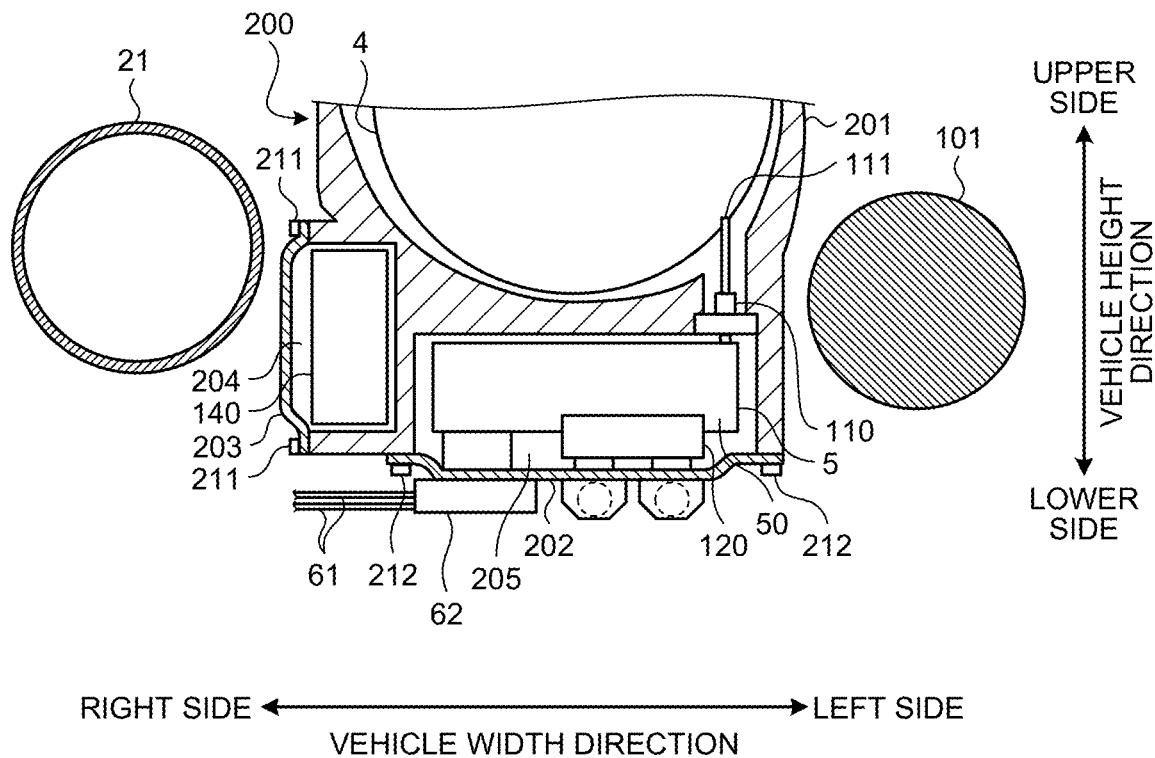
FIG. 2 is a cross-sectional view of a front module and the surroundings thereof as viewed from the front side in a vehicle front-rear direction.

FIG. 1 illustrates a schematic configuration of a hybrid electric vehicle 1 according to an embodiment. FIG. 2 is a cross-sectional view of a front module 200 and the surroundings thereof as viewed from the front side in a vehicle front-rear direction.

As illustrated in FIG. 1, the hybrid electric vehicle 1 according to the embodiment includes an engine 2, a damper device 3, a rotary electric machine 4, a power control unit (PCU) 5, a battery 6, a torque converter 7, an automatic transmission 8, a transfer 9, an exhaust pipe 21, an exhaust gas purification catalyst device 22, a connecting/disconnecting clutch 40, an oil pump 130, a front propeller shaft 101, a front differential 102, a front drive shaft 103, front wheels 104, a rear propeller shaft 105, a rear differential 106, a rear drive shaft 107, rear wheels 108, and the like. Furthermore, in the hybrid electric vehicle 1 according to the embodiment, for example, the rotary electric machine 4, the connecting/disconnecting clutch 40, and the torque converter 7 are housed in a case 201 serving as a case member to constitute the front module 200.

The hybrid electric vehicle 1 is a four-wheel drive vehicle that can travel by rotating the front wheels 104 and the rear wheels 108, which are driving wheels, by using power of at least one of the engine 2 and the rotary electric machine 4.

The engine 2 is an internal combustion engine such as a gasoline engine and a diesel engine. The exhaust pipe 21 is connected to the engine 2. The exhaust pipe 21 forms an exhaust path for discharging exhaust gas. The exhaust pipe 21 is configured to discharge exhaust gas to the rear side of the vehicle body. The exhaust gas purification catalyst device 22 is provided in the middle of the exhaust pipe 21.

The damper device 3 is coupled to a crankshaft 23 of the engine 2. Furthermore, the connecting/disconnecting clutch 40 is provided in a power transmission path between the engine 2 and the rotary electric machine 4. The connecting/disconnecting clutch 40 serves as a connecting/disconnecting device that connects and disconnects the power transmission path. The connecting/disconnecting clutch 40 is, for example, a wet multiple clutch frictionally engaged by hydraulic pressure, and is coupled to the damper device 3 via a rotary shaft 31.

The rotary electric machine 4 is provided in the power transmission path between the engine 2 and the driving wheel. The rotary electric machine 4 is a motor generator including a rotor 41, a stator 42, and the like, and is driven by electric power supplied from the battery 6 via the PCU 5. Furthermore, the rotary electric machine 4 can generate electric power by the rotor 41 being rotated by the power transmitted from the engine 2 or the driving wheel, and charge the battery 6 via the PCU 5.

The PCU 5 converts electric power between the rotary electric machine 4 and the battery 6, and controls the rotary electric machine 4. In the PCU 5, electronic components such as a control board, an inverter, and a capacitor are housed in a PCU case 50. The PCU 5 is connected to a positive/negative (PN) connector provided on a cable 61 for connection with the battery 6. The battery 6 serves as an electric storage device mounted on the hybrid electric vehicle 1. The battery 6 and the PCU 5 are electrically connected via the cable 61. A PN connector 62 is a connection portion between the battery 6 and the PCU 5, and is a two-pole connector that connects positive and negative electrodes of the battery 6 to the PCU 5. As illustrated in FIG. 2, the PCU 5 is electrically connected to the rotary electric machine 4 via a bus bar 111 provided on a terminal block 110 in the case 201. Thus, the rotary electric machine 4 is electrically connected to the battery 6 via the PCU 5. Furthermore, a cooler 120 through which a coolant flows is connected to the PCU 5. The cooler 120 cools each electronic component of the PCU 5.

The torque converter 7 includes a pump impeller 7a, a turbine runner 7b, a stator 7c, and a lock-up clutch 7d. The pump impeller 7a is coupled to the rotor 41 of the rotary electric machine 4 via a rotary shaft 43, and is rotatable in conjunction with the rotation of the rotor 41. The lock-up clutch 7d is controlled to any of an engaged state, a released state, or a semi-engaged state based on a control signal from an ECU 10.

The automatic transmission 8 is coupled to the torque converter 7 via a rotary shaft 71, and is provided in a power transmission path between the torque converter 7 and the transfer 9. The automatic transmission 8 is, for example, a stepped automatic transmission capable of selectively forming a plurality of gear stages having different transmission gear ratios.

The transfer 9 distributes the power input from the automatic transmission 8 to the front propeller shaft 101 and the rear propeller shaft 105. The power distributed to the front propeller shaft 101 is transmitted to the right and left front wheels 104 via the front differential 102 and the right and left front drive shafts 103. Furthermore, the power distributed to the rear propeller shaft 105 is transmitted to the right and left rear wheels 108 via the rear differential 106 and the right and left rear drive shafts 107.

The mechanical oil pump 130 is coupled to the pump impeller 7a of the torque converter 7 via a cylindrical coupling member 131, operates in conjunction with the rotation of the pump impeller 7a, sucks hydraulic oil stored in a later-described oil pan 203, and ejects the hydraulic oil to a valve body 140. The valve body 140 is provided with, for example, a switching valve, a hydraulic pressure control valve, a hydraulic circuit, and the like. For example, at the time of controlling the operation of engagement and release of the connecting/disconnecting clutch 40 and the lock-up clutch 7d, the valve body 140 adjusts each of a control hydraulic pressure of the connecting/disconnecting clutch 40 and a control hydraulic pressure of the lock-up clutch 7d to be supplied to the connecting/disconnecting clutch 40 and the lock-up clutch 7d by using a control signal from the ECU 10 and by defining the hydraulic pressure supplied from the oil pump 130 as an original pressure.

As illustrated in FIG. 2, the front module 200 is disposed between the exhaust pipe 21 and the front propeller shaft 101 in a vehicle width direction. The exhaust pipe 21 is disposed in the case 201 on the right side in the vehicle width direction at an interval. The front propeller shaft 101 is disposed in the case 201 on the left side in the vehicle width direction at an interval. Note that the exhaust pipe 21 and the front propeller shaft 101 may be disposed in the case 201 at right and left opposite positions in the vehicle width direction.

The oil pan 203 and an undercover 202 are openably fixed on the case 201 by bolts 211 and 212, which are fixing members. The oil pan 203 closes an opening formed at a side portion on the side of the exhaust pipe 21 of the case 201. The undercover 202 closes an opening formed in a lower portion of the case 201. Hydraulic oil used for the operation of the connecting/disconnecting clutch 40 and the lock-up clutch 7d is stored while the valve body 140 is housed in a side housing chamber 204 partitioned by the side portion on the side of the exhaust pipe 21 of the case 201 and the oil pan 203. Furthermore, the PCU 5 is housed in a lower housing chamber 205 partitioned by the lower portion of the case 201 and the undercover 202.

In the hybrid electric vehicle 1 according to the embodiment, the PCU 5 is mounted in a mechanically/electrically integral manner with the rotary electric machine 4 (in a structure in which the rotary electric machine 4 and the PCU 5 are electrically connected directly in the case 201) in a lower portion of the case 201 and vertically below the rotary electric machine 4. Furthermore, in the hybrid electric vehicle 1 according to the embodiment, the valve body 140 is mounted in a side portion on the side of the exhaust pipe 21 in the vehicle width direction of the case 201, and the valve body 140 and the front module 200 coexist in the case 201. As a result, the PCU 5 and the valve body 140 can be disposed around the front module 200 while securing a gap between peripheral components of the front module 200 such as the exhaust pipe 21 and the front propeller shaft 101 and the PCU 5 and the valve body 140.

In the hybrid electric vehicle 1 according to the embodiment, the PCU 5 is mounted in the lower portion of the case 201 that houses the front module 200, so that the risk of damage to the PCU 5 due to being sandwiched between the peripheral components at the time of collision from the side of the vehicle can be reduced.

Furthermore, in the hybrid electric vehicle 1 according to the embodiment, the PCU 5 is mounted on the lower portion of the case 201 that houses the front module 200, so that replacement operation of the PCU 5 can be easily performed by removing the undercover 202 from the lower side of the hybrid electric vehicle 1 lifted by a car lift, for example.

Furthermore, in the hybrid electric vehicle 1 according to the embodiment, the PCU 5 is mounted in the lower portion of the case 201 that houses the front module 200. This makes the PCU 5 less likely to receive heat from the exhaust pipe 21 than in the case where the PCU 5 is mounted in the side portion on the side of the exhaust pipe 21 of the case 201. The exhaust pipe 21 is a heat generation source having higher temperature than the PCU 5. As a result, adverse effects (thermal damages) of heat of the exhaust pipe 21 on the PCU 5 can be inhibited.

Furthermore, in the hybrid electric vehicle 1 according to the embodiment, the exhaust pipe 21, the valve body 140, and the PCU 5 are disposed in this order from the right side (one side) to the left side (other side) in the vehicle width direction. As a result, the valve body 140 having higher heat resistance than the PCU 5 functions as a heat transfer inhibition unit for inhibiting heat transfer from the exhaust pipe 21 to the PCU 5, so that adverse effects (thermal damages) of heat of the exhaust pipe 21 on the PCU 5 can be effectively inhibited.

Figure 3:
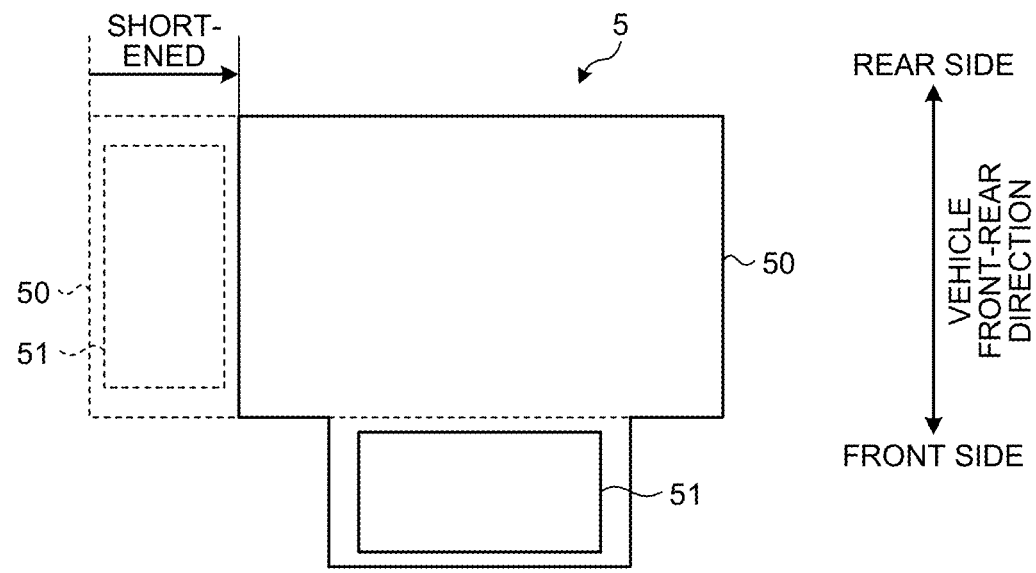
FIG. 3 illustrates a PCU having a protruding shape on the front side in the vehicle front-rear direction.

FIG. 3 illustrates the PCU 5 having a protruding shape on the front side in the vehicle front-rear direction.

In the hybrid electric vehicle 1 according to the embodiment, for example, as illustrated in FIG. 3, the PCU 5 may have a protruding shape on the front side in the vehicle front-rear direction. In the case, for example, as illustrated in FIG. 3, a capacitor 51 can be disposed at a protrusion of the PCU 5. The terminal block 110, a PCU side terminal, and the like can be disposed at the protrusion. The terminal block 110 supports the bus bar 111. The PCU side terminal is connected to the PN connector 62. The PCU 5 having a protruding shape on the front side in the vehicle front-rear direction can shorten the width of the PCU 5 in the vehicle width direction. Note that the PCU 5 may have a protruding shape on the rear side in the vehicle front-rear direction. Also, in the case, the width of the PCU 5 in the vehicle width direction can be shortened. As described above, the width in the vehicle width direction in the lower portion of the case 201 in which the PCU 5 is mounted can be narrowed by shortening the width of the PCU 5 in the vehicle width direction. The gap in the vehicle width direction between a peripheral component such as the exhaust pipe 21 and the front propeller shaft 101 and the case 201 can be easily secured.

According to an embodiment, a power control unit is provided below a rotary electric machine, and a heat generation source, a heat transfer inhibition unit, and the power control unit are disposed in this order from one side to the other side in a vehicle width direction. As a result, the power control unit is less likely to receive heat from the heat generation source, so that an effect of inhibiting adverse effects of heat of the heat generation source on the power control unit is exhibited.

According to an embodiment, a power control unit is provided below a rotary electric machine, and a heat generation source, a heat transfer inhibition unit, and the power control unit are disposed in this order from one side to the other side in a vehicle width direction. As a result, the power control unit is less likely to receive heat from the heat generation source, so that adverse effects of heat of the heat generation source on the power control unit can be inhibited.

According to an embodiment, adverse effects of heat of an exhaust pipe on the power control unit can be inhibited.

According to an embodiment, replacement operation of the power control unit can be easily performed by removing a cover member from the lower side of the hybrid electric vehicle.

According to an embodiment, the valve body having higher heat resistance than the power control unit inhibits heat transfer from the heat generation source to the power control unit, so that adverse effects of heat of the heat generation source on the power control unit can be effectively inhibited.

According to an embodiment, the rotary electric machine and the power control unit can be electrically connected directly in a case member.

According to an embodiment, the width in the vehicle width direction on the lower portion of the case member in which the power control unit is provided can be narrowed by shortening the width of the power control unit in the vehicle width direction. The gap in the vehicle width direction between a peripheral component and the case member can be easily secured.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A hybrid electric vehicle comprising:
an internal combustion engine;
a rotary electric machine;
an electric storage device; and
a power control unit that converts electric power between the rotary electric machine and the electric storage device, and controls the rotary electric machine,
the hybrid electric vehicle being capable of traveling by rotating a driving wheel by using power of at least one of the internal combustion engine and the rotary electric machine,
wherein the power control unit is provided below the rotary electric machine, and
a heat generation source that has higher temperature than the power control unit, a heat transfer inhibition unit that inhibits heat transfer from the heat generation source to the power control unit, and the power control unit are disposed in this order from one side to another side in a vehicle width direction.

2. The hybrid electric vehicle according to claim 1, comprising an exhaust pipe that discharges exhaust gas from the internal combustion engine,
wherein the heat generation source is the exhaust pipe.

3. The hybrid electric vehicle according to claim 1, comprising:
a connecting/disconnecting device that connects and disconnects a power transmission path between the internal combustion engine and the rotary electric machine;
a case member that houses at least the rotary electric machine and the connecting/disconnecting device;
a cover member that covers an opening formed in a lower portion of the case member; and
one or more fixing members that detachably fix the cover member to the case member,
wherein the rotary electric machine is provided in the power transmission path provided between the internal combustion engine and the driving wheel, and
the power control unit is housed in a lower housing chamber partitioned by the lower portion of the case member and the cover member.

4. The hybrid electric vehicle according to claim 3, comprising:
an oil pan that is provided on a side portion on a side of the heat generation source of the case member and that stores hydraulic oil to be used to operate the connecting/disconnecting device; and
a valve body that is housed in a side housing chamber partitioned by the side portion on the side of the heat generation source of the case member and the oil pan and that adjusts hydraulic pressure to be supplied to the connecting/disconnecting device,
wherein the heat transfer inhibition unit is the valve body.

5. The hybrid electric vehicle according to claim 3,
wherein a bus bar that electrically connects the rotary electric machine and the power control unit is provided in the case member.

6. The hybrid electric vehicle according claim 3,
wherein the power control unit is formed in a protruding shape on a front side or a rear side in a vehicle front-rear direction.

* * * * *